United States Patent [19]
Fink

[11] Patent Number: 6,082,938
[45] Date of Patent: *Jul. 4, 2000

[54] INTEGRAL FRAME AND METHOD OF MANUFACTURE

[75] Inventor: Carl Joseph Fink, Keller, Tex.

[73] Assignee: Lockheed Martin Corporation, Bethesda, Md.

[*] Notice: This patent is subject to a terminal disclaimer.

[21] Appl. No.: 09/207,285

[22] Filed: Dec. 8, 1998

[51] Int. Cl.$^7$ ........................................................ B23C 9/00
[52] U.S. Cl. ............................................ 409/132; 409/131
[58] Field of Search ........................ 409/132; 29/897.312

[56] References Cited

U.S. PATENT DOCUMENTS

| | | |
|---|---|---|
| 3,749,625 | 7/1973 | Berg . |
| 4,260,304 | 4/1981 | Jacobi . |
| 5,079,821 | 1/1992 | Parsons . |
| 5,273,806 | 12/1993 | Lockshaw et al. . |
| 5,487,930 | 1/1996 | Lockshaw et al. . |
| 5,508,085 | 4/1996 | Lockshaw et al. . |
| 5,836,729 | 11/1998 | Fink ........................................ 409/132 |

FOREIGN PATENT DOCUMENTS

| | | |
|---|---|---|
| 671941 | 7/1979 | U.S.S.R. . |
| 733877 | 5/1980 | U.S.S.R. . |
| 1227372 | 4/1986 | U.S.S.R. . |
| 1227373 | 4/1986 | U.S.S.R. . |
| 1404201 | 6/1988 | U.S.S.R. . |

*Primary Examiner*—Stephen F. Gerrity
*Assistant Examiner*—Adrian M. Wilson
*Attorney, Agent, or Firm*—Felsman Bradley Vaden Gunter & Dillon, LLP; James E. Bradley

[57] ABSTRACT

A unitary frame structure is disclosed as well as a method of manufacturing the same. The unitary frame structure typically includes a first beam, a second beam adjoining the first beam, and a cross member adjoining the first beam and the second beam. Significantly, each of the first beam, second beam and cross beams have a Z shaped cross-sectional structure formed by a first flange that is adjacent a substantially vertical portion further shaped with a second lip adjacent an opposite end of the first lip. This Z cross section is formed by machining a unitary pallet in a first vertical direction to form the first lip, flipping the pallet and then machining in a substantially vertical portion in the opposite second vertical direction to form the second lip on an opposite side of the substantially web section only. Placed periodically along the rib sections are stiffening elements formed during the machining operation.

5 Claims, 3 Drawing Sheets

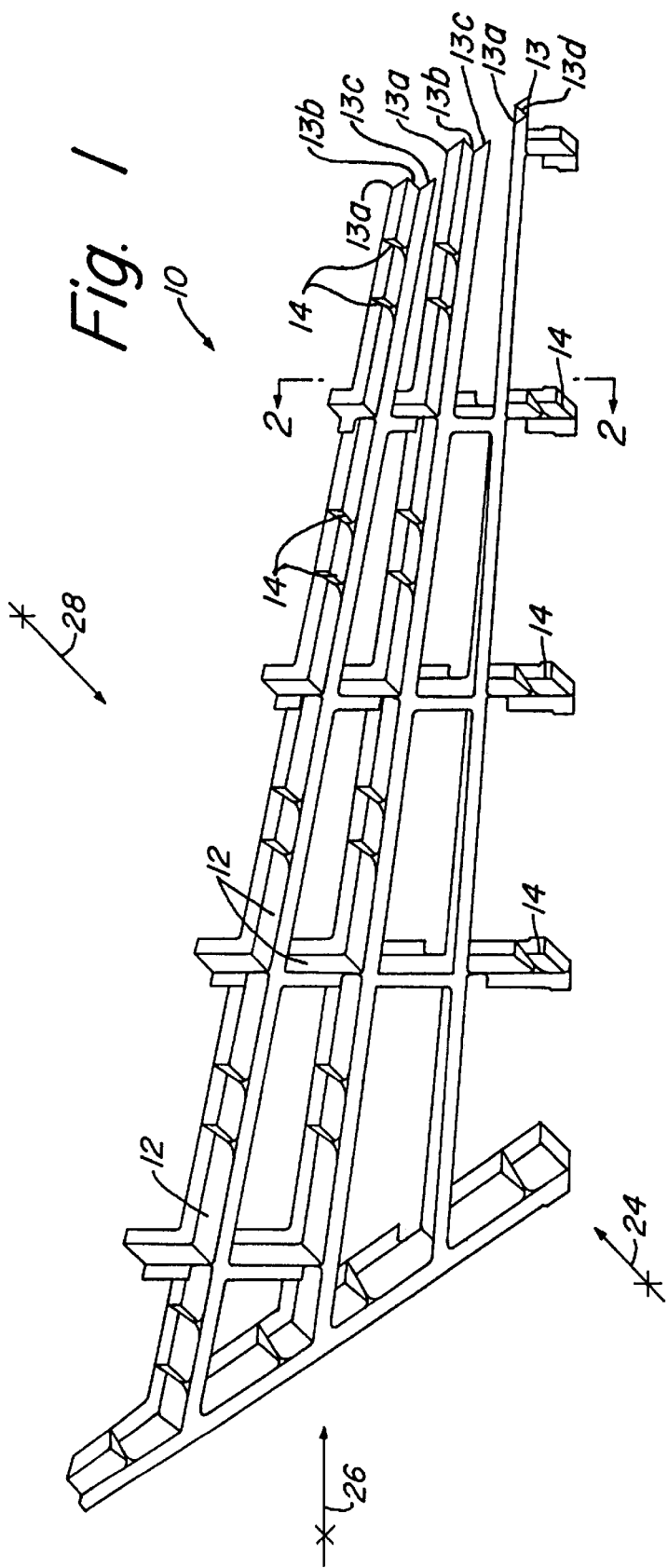

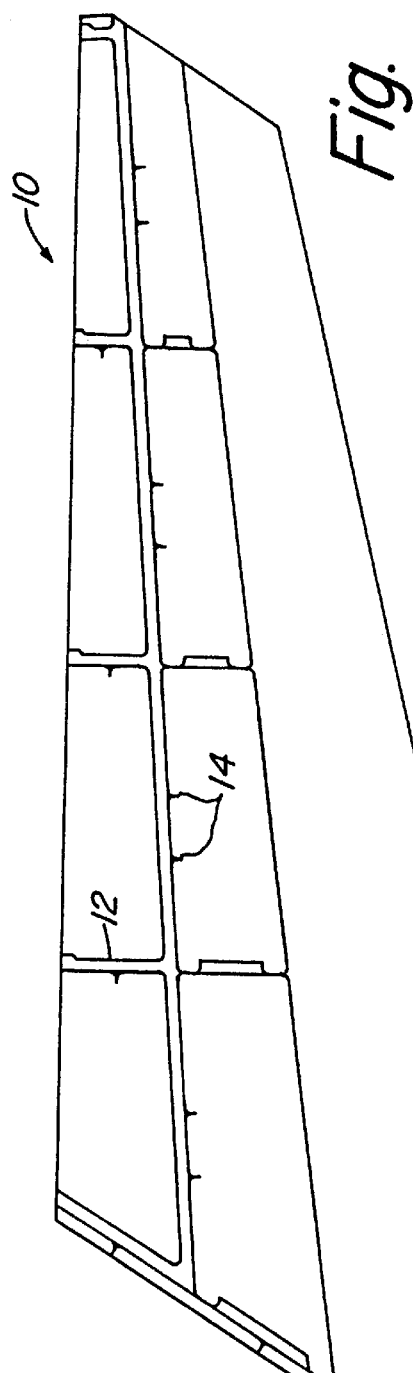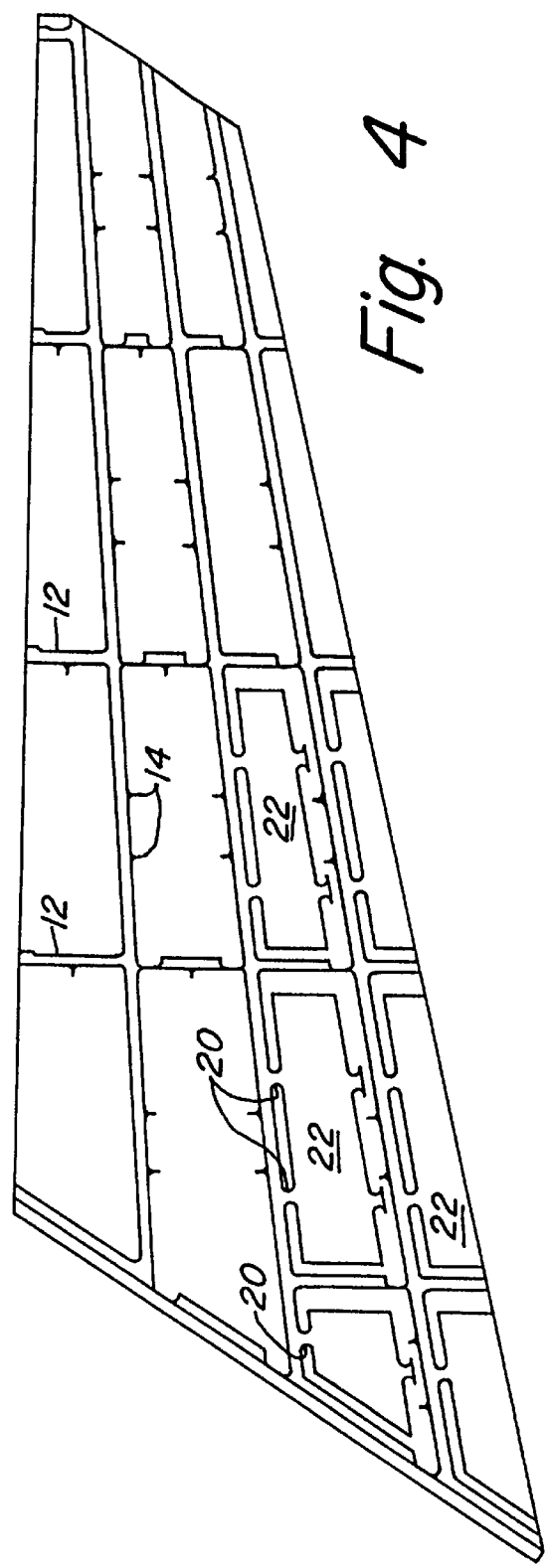

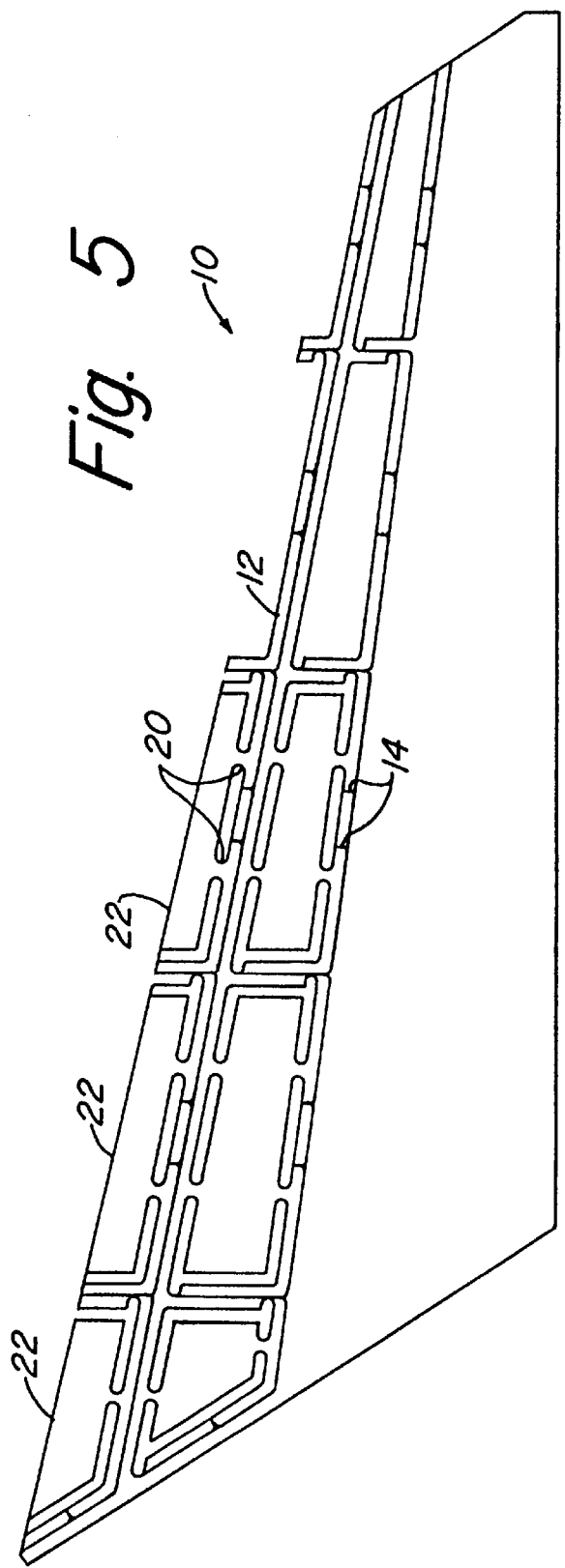
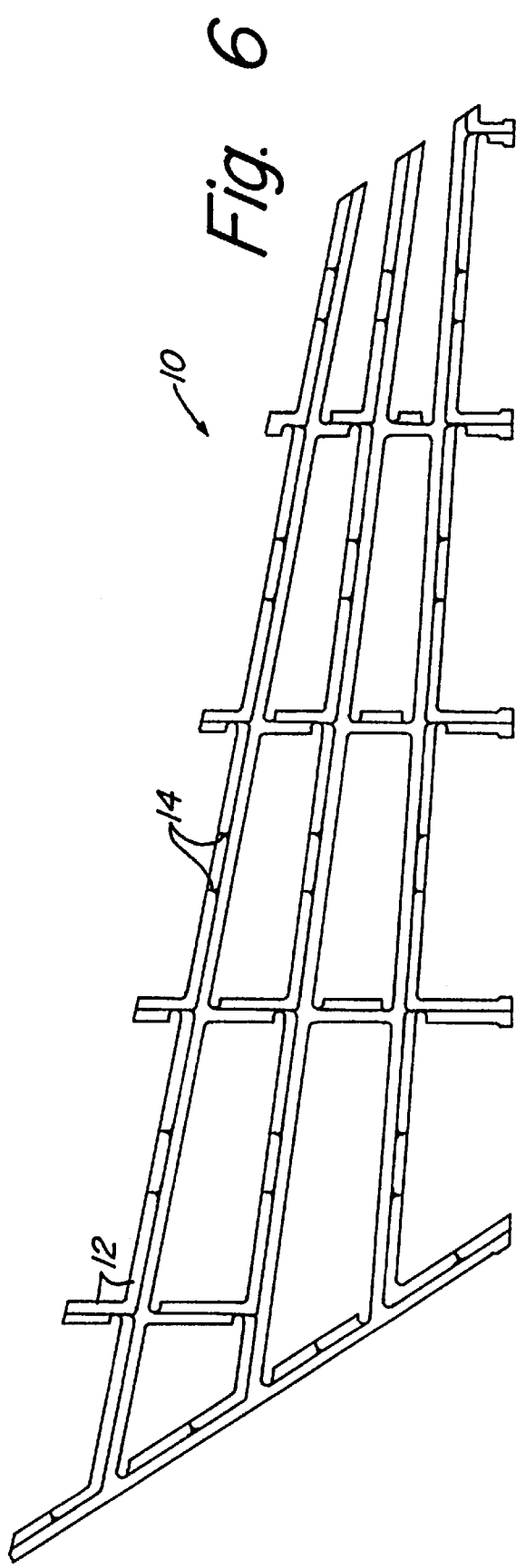

INTEGRAL FRAME AND METHOD OF MANUFACTURE

TECHNICAL FIELD

The present invention relates generally to an integrated frame structure and a method of manufacture. More particularly, the present invention relates to a highly integrated frame manufactured substantially from a single block of material having a high degree of strength with a minimal amount of assembly.

BACKGROUND ART

Frame understructures used in environments subject to great physical stress are well-known in the art. For example, one type frame understructure is used in the vertical tail section of military aircraft such as, for example, the F-16 fighter jet manufactured by Lockheed. The vertical tail structure typically consists of numerically controlled (NC) machined C-channel spars and ribs mechanically fastened together. The outboard panel of the aileron is a bonded assembly, typically comprising graphite/epoxy skins bonded to aluminum honeycombed core and mechanically fastened to the NC machined aluminum periphery structure. While this bonded assembly is considered to be one of the lightest possible structure configurations, there are substantial manufacturing risks associated with bonding dissimilar metals and materials as well as the normal risks associated with the bonding assembly.

Milling a frame from a single block of metal is also well-known in the art. Unfortunately, these previously designed or manufactured substantially integrated understructures required additional supports afterward or lacked strong rigidity necessary for high stress environments. Further, these prior solutions suffered from the drawbacks of having high waste byproducts as well as long lead times for manufacture and development and high expense relative to previously available frame structures.

Accordingly, there is a need for an improved method of manufacturing highly integrated understructures that overcome the prior problems of undue waste, high lead time, and great expense in design preparation and manufacture.

DISCLOSURE OF THE INVENTION

According to the present invention, a unitary frame structure is disclosed as well as a method of manufacturing the same. The unitary frame structure typically includes a first beam, a second beam adjoining the first beam, and a cross member adjoining the first beam and the second beam. Significantly, each of the first rib, second rib and cross member have a Z shaped cross-sectional structure formed by a first lip or flange that is adjacent a substantially vertical portion further shaped with a second lip or flange adjacent an opposite end of the first lip or flange. This Z cross section is formed by machining a unitary pallet in a first vertical direction to form the first flange, then flipping the pallet, and then machining in a substantially vertical direction in the opposite second vertical direction to form the second flange on an opposite side of the substantially vertical section only. Placed periodically along the beam sections are stiffening elements formed during the machining operation. The stiffening elements are formed to resist bending in a principle bending direction along the Z section. The stiffening elements typically have a substantially flat plane that is skewed to the vertical portions or webs thereby connecting one of the flanges to the adjacent vertical portion or web. These stiffening elements are typically placed back-to-back on adjacent sides on the same Z cross section.

The method to manufacture the unitary frame follows the following steps. First, the unitary pallet is machined in a first vertical direction to form a first flange and a first side of a web. The pallet is then moved in a horizontal direction relative to the machine element. Then the machine element is selectively tilted in the vertical direction so as to form stiffening elements along the first lip flange. Next, the machining of the unitary pallet is performed in a second vertical direction parallel to the first vertical direction to form a second flange on a second side of the substantially vertical portion. These machine operations form the Z cross section. Just as was done in the first vertical direction, the machine element is moved relative to the vertical pallet in a horizontal direction in the second vertical direction to form stiffening elements on the reverse side. Typically, the stiffening elements are adjacent one another at the same Z section. The beveled surface of the stiffening elements is skewed to the vertical portions thereby connecting one of the lips with the adjacent vertical portion. Lastly, any extraneous blocks of material not part of the Z cross sections are removed.

BRIEF DESCRIPTION OF THE DRAWINGS

FIG. 1 depicts a vertical tail understructure;

FIG. 2 is a cutaway side view of the structure in the direction shown in FIG. 1;

FIG. 3 depicts a top plan view of a first side being milled;

FIG. 4 illustrates selected sections being completely processed and other sections remaining to be processed;

FIG. 5 is a top plan view of the reverse of the structure where several blocks have been removed with several other block having yet to be removed by the cutting of the tab sections; and FIG. 6 illustrates a top plan view of the frame structure after completion.

BEST MODE FOR CARRYING OUT THE INVENTION

A one-piece machined understructure for use in high stress environments has been developed. This novel integrated structure eliminates traditional bonded assembly practices as well as reduces the weight of a built-up understructure previously used in such high stress environments. For purposes of illustrating the advantages of the novel design and method of manufacturing an understructure 10, one embodiment of the invention is disclosed in FIG. 1. The invention is a vertical tail understructure typically used in a military jet aircraft, for example an F-16. Other uses for the method and manufacture as well as the design aspects of the understructure 10 will become readily apparent to those skilled in the art and is not intended to be limited to merely being a vertical tail understructure for use in a jet aircraft.

As applied to a control surface, the novel method of the present invention result in an integrated understructure 10 that replace four machined details and several core details of integrated understructure 10 with a single multi-ribbed machined part. A substantial portion of understructure 10 is, instead, machined from just two sides of a single billet of material including all of interior ribs or beams 12.

By contrast, the previous vertical tail understructure manufactured according to the prior manufacturing technology required six internal beams and three internal spars, comprising forty detailed parts in all for a comparable design. The structure 10 is milled from a single machine detail.

Interior ribs or beams 12 are designed to have a Z-cross section which is defined by a first lip 13a, a substantially vertical portion 13b, and a second lip 13c. Additionally, stiffeners 14 are periodically spaced along each beam 12. Stiffeners 14 are included to provide web buckling resistance and flange support for fuel pressure. Fuel flow holes and routing holes for tubing are added to the webs secondarily after the part is machined.

FIG. 2 is a cutaway side view of structure 10 in the direction shown in FIG. 1. In this view, the Z structure 16 is most evident as well as the machining of the stiffeners. A milling bit 18 mills substantially vertically while forming the Z section beams and then is tilted sideways so as to provide the stiffener sections to the beam. Once the first side is completed, then the entire structure 10 is rotated 180 degrees to mill the second side.

FIG. 3 depicts a top plan view of a first side being milled while FIG. 4 illustrates selected sections of the second side being completely processed, with other sections still remaining to be processed. During the milling process, tabs 20 are maintained between the extraneous material 22 to be removed and the frame structure 10. At a later stage, upon completion of the milling process, the tabs are cut and then filed, thus removing the extraneous material. The extraneous material, depending on the size, may be used for other, smaller parts for other applications, thus reducing material waste.

FIG. 5 is a top plan view of the second side of structure 10 where several blocks 22 have been removed with several other blocks 22 having yet to be removed by the cutting of tabs 20. The remaining portion has yet to be milled. Typically, however, both sides are milled before any blocks 22 are removed and this drawing is provided for illustrative purposes. FIG. 6 illustrates a top plan view of frame structure 10 after completion, including the filing of the tabs 20.

The finished integrated understructure 10, illustrated in FIG. 6, achieves substantial cost reduction over the prior method for several reasons. One reason is that the imaginary drawing count is reduced by thirty drawings (for an entire aircraft) as compared to a part by part assembly that was previously required. Additionally, the detailed part count is reduced by approximately eighty fewer details, which also leads to a reduced count in fasteners required. Since a single billet of material is used that requires substantially no assembly after being machined, significant tooling reduction is also achieved. Additionally, since the process is machined, manual labor necessary to assemble the understructure is reduced.

The method to manufacture the unitary frame structure 10 follows the following steps. First, the unitary pallet is machined in a first vertical direction 24 to form a first flange 13a and a first substantially vertical web portion 13b. The pallet is then moved in a horizontal direction 26 relative to the machine element and then the machine element is selectively tilted in the vertical direction so as to form stiffening elements 14 along the first flange 13a in the substantially vertical web portion 13b. Next, the machining of the unitary pallet is performed in a second vertical direction 28 parallel to the first vertical direction 24 to form a second flange 13c in a second substantially vertical portion. These resulting machine operations form the Z cross section or Z structure 16. Just as was done on the first vertical direction 24, the machine element is moved relative to the vertical pallet in a horizontal direction 26 in the second vertical direction 28 to form stiffening elements 14 on the reverse side. This step may be accomplished by flipping the pallet. Typically, the stiffening elements 14 are adjacent one another at the same Z section. The beveled surface of the stiffening elements 14 is skewed to the vertical portions, thereby connecting one of the flanges 13a or 13c with the adjacent vertical web portion 13b. Lastly, any extraneous blocks 22 of material not part of the Z cross sections are removed.

In this application, there are thirty fewer drawings to prepare, check, release and maintain, as well as significantly fewer detail parts to procure, receive and stock over the previous method of manufacture. Entire major tools such as bond forms, are eliminated with the change to the integrated understructure. The inclusion of tooling tabs on the understructure and skins further reduces the tooling required, which leads to a shift from a multiple tool assembly process to a bench operation. Further, assembly time is reduced as the understructure is already assembled as machined, and there are no mismatches between spar flanges and rib flanges to be shimmed or adjusted.

Yet another significant benefit of the application of the integrated understructure to the control surfaces is the elimination of the bonded assemblies and their associated risks. To minimize weight and maximize control surface effectiveness, previously used bonded assemblies techniques utilized graphite/epoxy skins and aluminum periphery spars. This construction is identical to the F-16 rudder. While lightweight, the concept is unpredictable from a producability standpoint. The dissimilar coefficients of thermal expansion of the spar and skins almost guarantee that the part will warp during the bonding process as the part cools. After many attempts, the aluminum spar in the F-16 rudder was pre-warped in the bond to counter this phenomena, allowing the spar to warp to a "straight" position during bonding. In most program schedules, there is not sufficient time to do such a trial and error approach.

The use of the integrated machined understructure in lieu of bonded assemblies provides additional savings after assembly. In the case of the bonded assembly, each assembly must have a full non-destructive inspection (NDI), possibly including x-rays, to determine completeness of the bond. Further, once in service, the bonded assembly always has the risk of core corrosion, especially in a high humidity environment. The integrated understructure component eliminates the need for the post assembly NDI and there is no chance for core corrosion.

The large, producible, lightweight one-piece machined understructure uses a Z section that allows for easy machining from two sides. Further, continuous spar flanges allow for stiffness in principle bending directions while the Z flanges allow for thin gauges of webs and flanges not otherwise cost-effectively achievable on conventional parts.

While the invention has been shown in only one of its forms, it should be apparent to those skilled in the art that it is not so limited, but is susceptible to various changes without departing from the scope of the invention.

I claim:

1. A method manufacturing a unitary frame structure comprising the steps of:
   with a machining element, machining a unitary pallet in a first vertical direction, thereby forming a first lip and a first substantially vertical portion;
   moving said unitary pallet in a horizontal direction relative to said machining element;
   selectively tilting said machining element in said vertical direction so as to form stiffening elements along said first lip in said first substantially vertical portion;

machining said unitary pallet in a second vertical direction parallel to said first vertical direction to form a second lip in a second substantially vertical portion, wherein said lips and said vertical portions form a beam with a Z cross-section;

moving said machining element relative to said vertical pallet in a horizontal direction; and moving said machining element relative to said second vertical direction in selected locations thereby forming stiffening elements along said second lip in said second substantially vertical portion.

2. The method according to claim 1, wherein said stiffening elements have a beveled surface skewed to said vertical portions connecting one of said lips with an adjacent vertical portion.

3. The method according to claim 1 further comprising the step of:

moving said unitary pallet in selected horizontal directions relative to said machining element, thereby forming adjoining rib sections to form a unitary frame structure.

4. The method according to claim 1 further comprising the step of:

removing any extraneous blocks of material not part of said Z cross-sections.

5. The method according to claim 1, wherein said unitary pallet comprises aluminum.

\* \* \* \* \*